(12) United States Patent
Kay (10) Patent No.: US 6,272,492 B1
(45) Date of Patent: *Aug. 7, 2001

(54) FRONT-END PROXY FOR TRANSPARENTLY INCREASING WEB SERVER FUNCTIONALITY

(75) Inventor: Jeffrey Brian Kay, Springfield, VA (US)

(73) Assignee: IBM Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,345

(22) Filed: Nov. 21, 1997

(51) Int. Cl.[7] .................................................. G06F 17/30
(52) U.S. Cl. .............................. 707/10; 707/3; 707/501; 709/218
(58) Field of Search ................................... 707/10, 104, 9, 707/103, 1–6, 501, 513; 395/610; 709/201–203, 217–219

(56) References Cited

U.S. PATENT DOCUMENTS

| | | | |
|---|---|---|---|
| 5,457,797 | 10/1995 | Butterworth et al. | 709/320 |
| 5,511,197 | 4/1996 | Hill et al. | 709/328 |
| 5,530,852 | 6/1996 | Meske, Jr. et al. | 709/206 |
| 5,623,601 * | 4/1997 | Vu | 713/202 |
| 5,694,546 * | 12/1997 | Reisman | 705/26 |
| 5,696,898 * | 12/1997 | Baker et al. | 707/9 |
| 5,710,918 * | 1/1998 | Lagarde et al. | 707/10 |
| 5,715,453 * | 2/1998 | Stewart | 707/104 |
| 5,721,908 * | 2/1998 | Lagarde et al. | 707/10 |
| 5,734,891 * | 3/1998 | Saigh | 707/10 |
| 5,848,410 * | 12/1998 | Walls et al. | 707/4 |
| 5,864,827 * | 1/1999 | Wilson | 705/35 |
| 5,873,077 * | 2/1999 | Kanoh et al. | 707/3 |
| 5,913,215 * | 6/1999 | Rubinstein et al. | 707/10 |
| 5,924,090 * | 7/1999 | Krellenstein | 707/5 |
| 5,933,832 * | 8/1999 | Suzuoka et al. | 707/101 |
| 5,960,404 * | 9/1999 | Chaar et al. | 705/8 |
| 5,963,965 * | 10/1999 | Vogel | 707/501 |
| 5,978,381 * | 11/2000 | Perlman et al. | 370/432 |
| 5,978,847 * | 11/1999 | Kisor et al. | 709/227 |
| 5,991,713 * | 11/1999 | Unger et al. | 704/9 |
| 5,991,810 * | 11/1999 | Shapiro et al. | 709/229 |
| 6,112,242 * | 8/2000 | Jois et al. | 709/225 |

OTHER PUBLICATIONS

"Novel Business Uses of Independently Created Hyperlinks in the World Wide Web: Baic Mechanism and Examples," Scholss, R. J., IBM Thomas Watson Center, Proceedings of the 29th Hawaii Int'l Conference on System Sciences, IEEE, Jan. 3–6, 1996, pp. 137–146.*

* cited by examiner

Primary Examiner—Hosain T. Alam
(74) Attorney, Agent, or Firm—Morgan & Finnegan, L.L.P.

(57) ABSTRACT

A system and method for system for electronic communication, in which functional enhancements may be added that require no modification or replacement of the content-storing servers and is transparent to web browser software. The system includes a front-end proxy server and at least one back-end server. The front-end proxy server receives a content request from a user system, processes the content request, and transmits the processed content request to a back-end server. The front-end proxy server receives a content item corresponding to the processed content request from the back-end server and transmits the content item to the user system. The back-end server comprises a content storage device containing a plurality of content items. The back-end server receives processed content requests from the front-end proxy server, retrieves a content item corresponding to the content request and transmits the retrieved content item to the front-end proxy server.

18 Claims, 11 Drawing Sheets

FRONT-END PROXY FOR TRANSPARENTLY INCREASING WEB SERVER FUNCTIONALITY

FIELD OF THE INVENTION

The present invention relates to a front-end proxy server for Internet web servers.

BACKGROUND OF THE INVENTION

The Internet has become an increasing popular medium of communication. One popular Internet service is the World Wide Web, which allows users to access servers using a graphical interface. Web access is available using commonly available personal computer hardware and a web browser application.

A web site is made up of one or more web servers, computer-based servers that store content that may be accessed by web users. Conventional web servers require modification in order to add functional enhancements, that is, functions that are not present in a current implementation. Extensive enhancements may require replacement of web servers or extensive reconfiguration of servers within a web site. In addition, many such enhancements require that the web browser software used to access a web site be aware of the modifications that have been made. In some cases, modification of the web browser software may be necessary to ensure proper functioning with the modified web site. Such modification is difficult due to the large number of users possessing copies of web browser software. A need arises for a technique for adding functional enhancements to a web site that requires no modification or replacement of the content-storing servers and is transparent to web browser software.

SUMMARY OF THE INVENTION

The present invention is a system and method for system for electronic communication, in which functional enhancements may be added that require no modification or replacement of the content-storing servers and is transparent to web browser software.

The system of the present invention includes a front-end proxy server and at least one back-end server. The front-end proxy server receives a content request from a user system, processes the content request, and transmits the processed content request to a back-end server. The front-end proxy server receives a content item corresponding to the processed content request from the back-end server and transmits the content item to the user system.

The back-end server comprises a content storage device containing a plurality of content items. The back-end server receives processed content requests from the front-end proxy server, retrieves a content item corresponding to the content request and transmits the retrieved content item to the front-end proxy server.

BRIEF DESCRIPTION OF THE DRAWINGS

The details of the present invention, both as to its structure and operation, can best be understood by referring to the accompanying drawings, in which like reference numbers and designations refer to like elements.

FIG. 1b is a block diagram of a front-end proxy server, shown in FIG. 1a.

FIG. 1c is a flow diagram of a process of handling user requests, implemented in the system shown in FIG. 1a.

FIG. 4b is a flow diagram of an electronic commerce process, implemented in the system shown in FIG. 4a.

FIG. 5b is a flow diagram of a transparent extended search process, implemented in the system shown in FIG. 5a.

DETAILED DESCRIPTION OF THE INVENTION

Figure 1A:
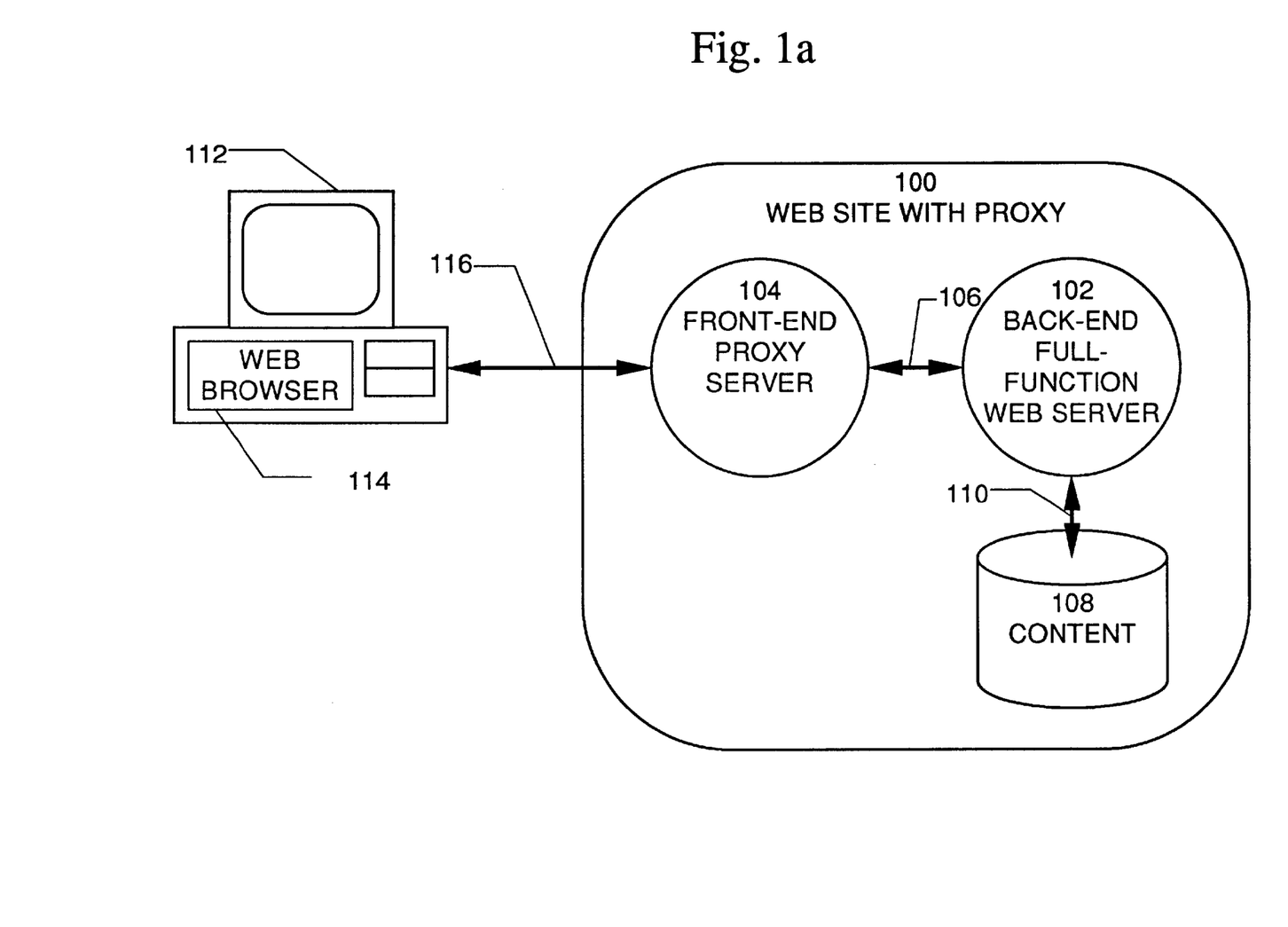
FIG. 1a is a block diagram of one embodiment of a web site including a front-end proxy server, according to the present invention.

An exemplary web site 100 having a front-end proxy server, according to the present invention, is shown in FIG. 1a. Web site 100 includes one or more back-end web servers, such as a back-end web server 102, and front-end proxy server 104. Servers 102 and 104 are coupled by communications link 106, which is typically a high-speed network connection, for example, 10T or 100T Ethernet, and communicate using a standard communication protocol, for example, Hypertext Transfer Protocol (HTTP). Server 102 is a full-function web server, which implements the features and functions of the web site. A major function of server 102 is the accessing and transmission of information content 108, which is typically included in server 102. Server 102 typically accesses and transmits content 108 using server application program interface (API) routines 110, which are typically implemented as part of the operating system of server 102.

Web site 100 is accessed by one or more users operating computer systems, such as client computer system 112. For simplicity, only one client and one web site are shown, although many web sites and clients are actually connected to the Internet. Client computer system 112 is typically a commonly-available personal computer, but may also be a mini-computer or mainframe. Computer 112 includes a conventional world wide web browser software program 114, such as NETSCAPE NAVIGATORS® or MICROSOFT INTERNET EXPLORERS®, which allows the user to access web sites, such as web site 100, using a graphical user interface. Computer 112 is coupled to web site 100 by communication link 116, which is typically the Internet, but may also include local area networks, etc. Computer 112 and web site 100 communicate over link 116 using a standard communication protocol, such as HTTP.

Front-end proxy server 104 acts as the entry point to web site 100 and to the back-end servers included in the web site.

Web browser 114 views proxy server 104 as a regular web server, which allows the user to view the web site as if there were no proxy present. Proxy server 104 typically includes no content, but rather accesses other servers, in particular back-end server 102, in order to retrieve actual web site content, and returns the retrieved content to web browser 114.

Figure 2:
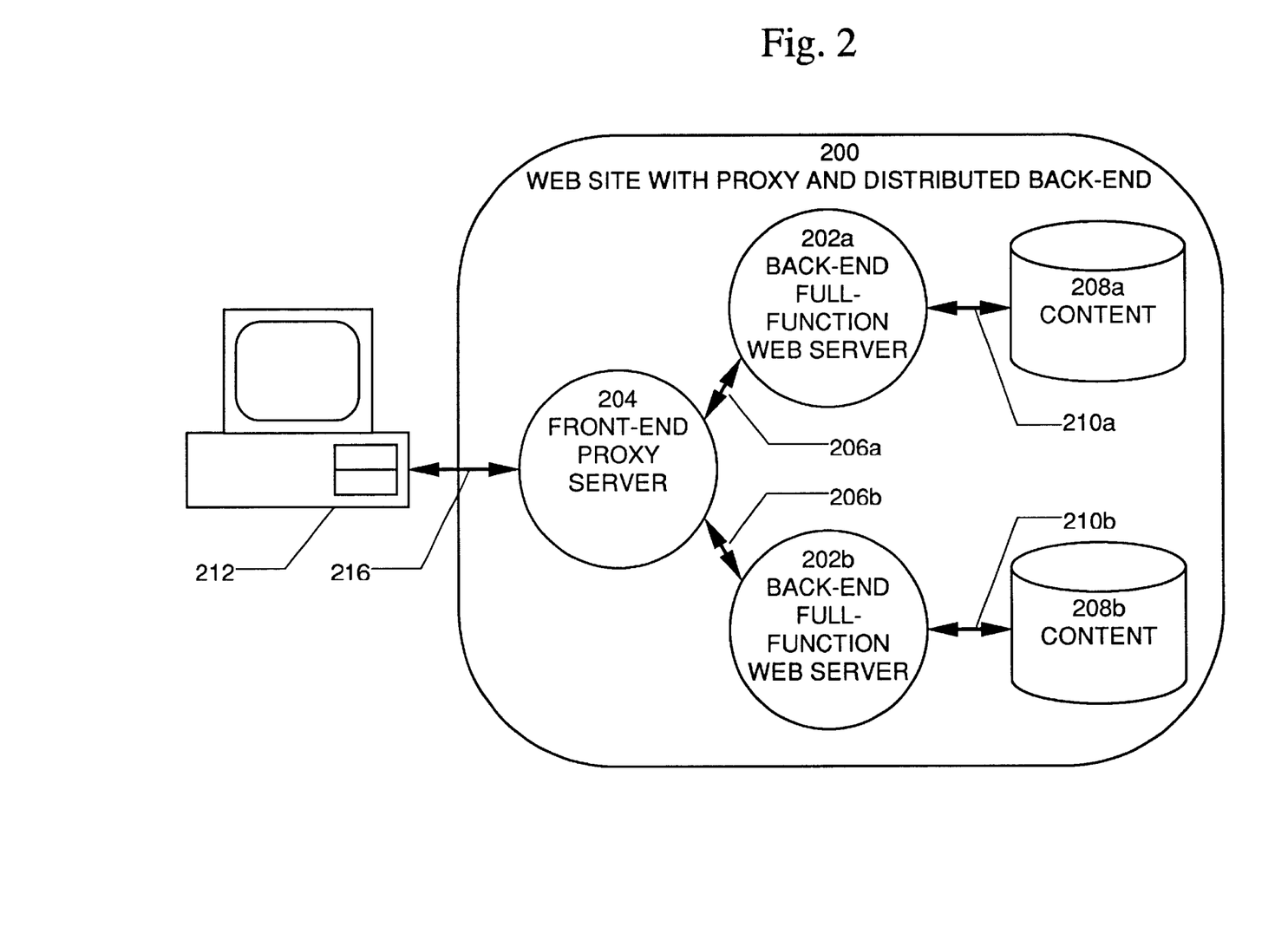
FIG. 2 is a block diagram of another embodiment of a web site including a front-end proxy server, and also including distributed back-end servers, according to the present invention.

For simplicity, in this and in many of the following examples of front-end proxy server systems, only one back-end server is shown. However, each of these examples is equally applicable to systems having more than one back-end server connected as shown in FIG. 2.

Figure 1B:
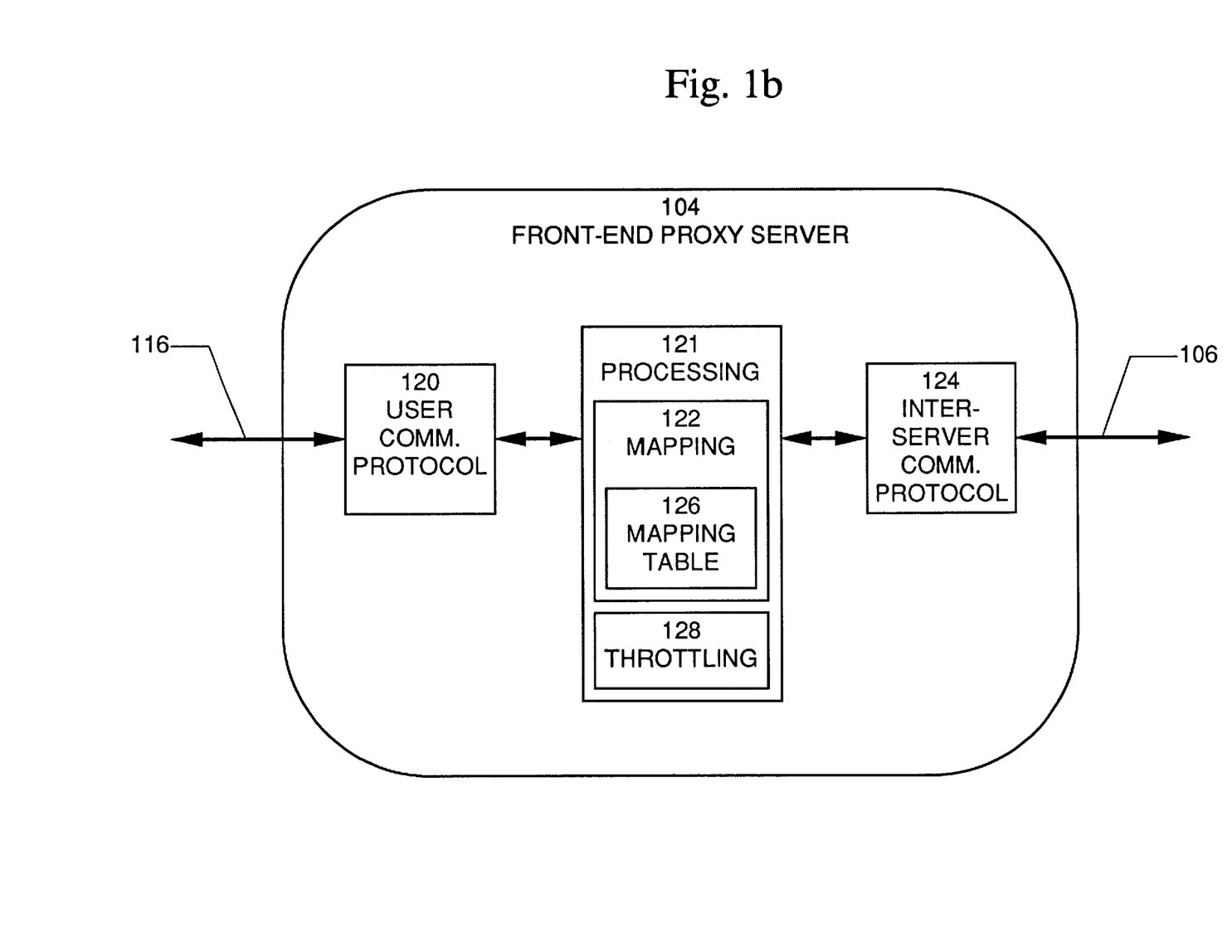
Figure 1C:
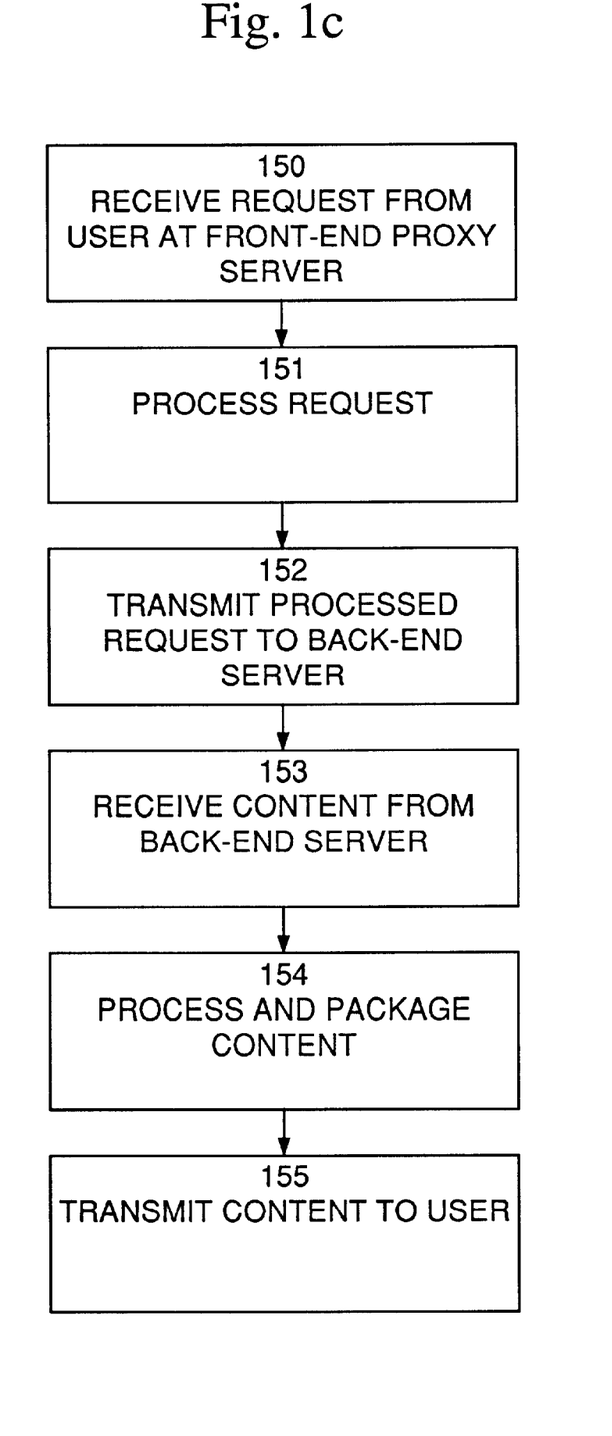

Front-end proxy server 104 is shown in more detail in FIG. 1b. Proxy server 104 includes user communication protocol block 120, processing block 121 and inter-server communication protocol block 124. User communication protocol block 120 implements a communication protocol that allows user computer systems, such as computer 112 of FIG. 1a, to communicate with proxy server 104 over link 116. Typically, link 116 is the Internet, but any bi-directional communications facility may be used. When the Internet is used, the communication protocol used is typically HTTP or secure HTTP. However, any communication protocol compatible with the communications facility may be used.

Inter-server communication protocol block 124 implements a communication protocol that allows proxy server 104 to communicate with back-end servers, such as server 102 of FIG. 1a, over link 106. In one typical configuration, link 106 is a high-speed local area network and the back-end servers are local to proxy server 104. In another typical configuration, link 106 is a high-speed wide area network and the back-end servers are present at locations that are remote from proxy server 104. Typically, the communication protocol used between proxy server 104 and a back-end server 102 is HTTP. However, any communication protocol compatible with the communications facility may be used.

Processing block 121 processes incoming content requests and outgoing content responses. Block 121 includes software routines that implement the desired front-end proxy functionality. Two exemplary function blocks are shown in FIG. 1b, mapping block 122 and throttling block 128. Mapping block 122 maps incoming content requests from users to one or more back-end servers that contain the requested content. Typically, mapping block 122 uses mapping table 124 to translate incoming content requests to new content requests that are transmitted to one ore more back-end servers. Mapping table 124 may specify processing that is to be performed.

Throttling block 128 implements a throttling function to manage the available bandwidth of an Internet connection. Content items retrieved from the back-end server would not be throttled from proxy access, but the front-end proxy would control the outbound flow.

Although two exemplary function blocks are shown in FIG. 1b, processing block 121 may include additional, or alternative, function blocks. The exemplary systems described below use additional function blocks in processing block 121, although for simplicity these function blocks are not shown.

A process which handles user requests, according to the present invention, is shown in FIG. 1b. The process begins with step 150, in which a front-end proxy server 104 receives a request for a content object from a web browser application program operated by a user. Content objects may include documents, graphics, programs, etc., which are included in content 108. The browser displays graphics and/or text which represents, identifies or describes objects that may be accessed. The user selects an object to be accessed, typically by clicking on the text or graphics representing the object. Each object is identified by an Internet address known as a uniform resource locator (URL). The URL specifies the location of an object on the Internet, including the web site which the object is located and the location of the object in that web site. Browser 104 stores an URL identifying each object for which text or graphics are displayed by the browser.

In step 151, front-end proxy server 104 processes the received request. The processing involved may cover a range of complexities. For example, a page retrieval request from a single back-end server that is being proxied may require only simple processing, such as destination selection, or it may require more complex processing, such as format conversion. In some cases, processing of a single received request may yield more than one processed request. In step 152, the processed request or requests are transmitted to one or more back-end servers, which handle each request by retrieving the content object specified by the request.

In step 153, the front-end proxy server receives one or more content objects from the back-end servers, then, in step 154, processes each content object and packages each object for transmission. The processing involved may cover a range of complexities. For example, a single retrieved page may require little or no processing, or complex page processing may be required. In step 155, the content is transmitted from the front-end proxy server to the user.

Figure 1D:
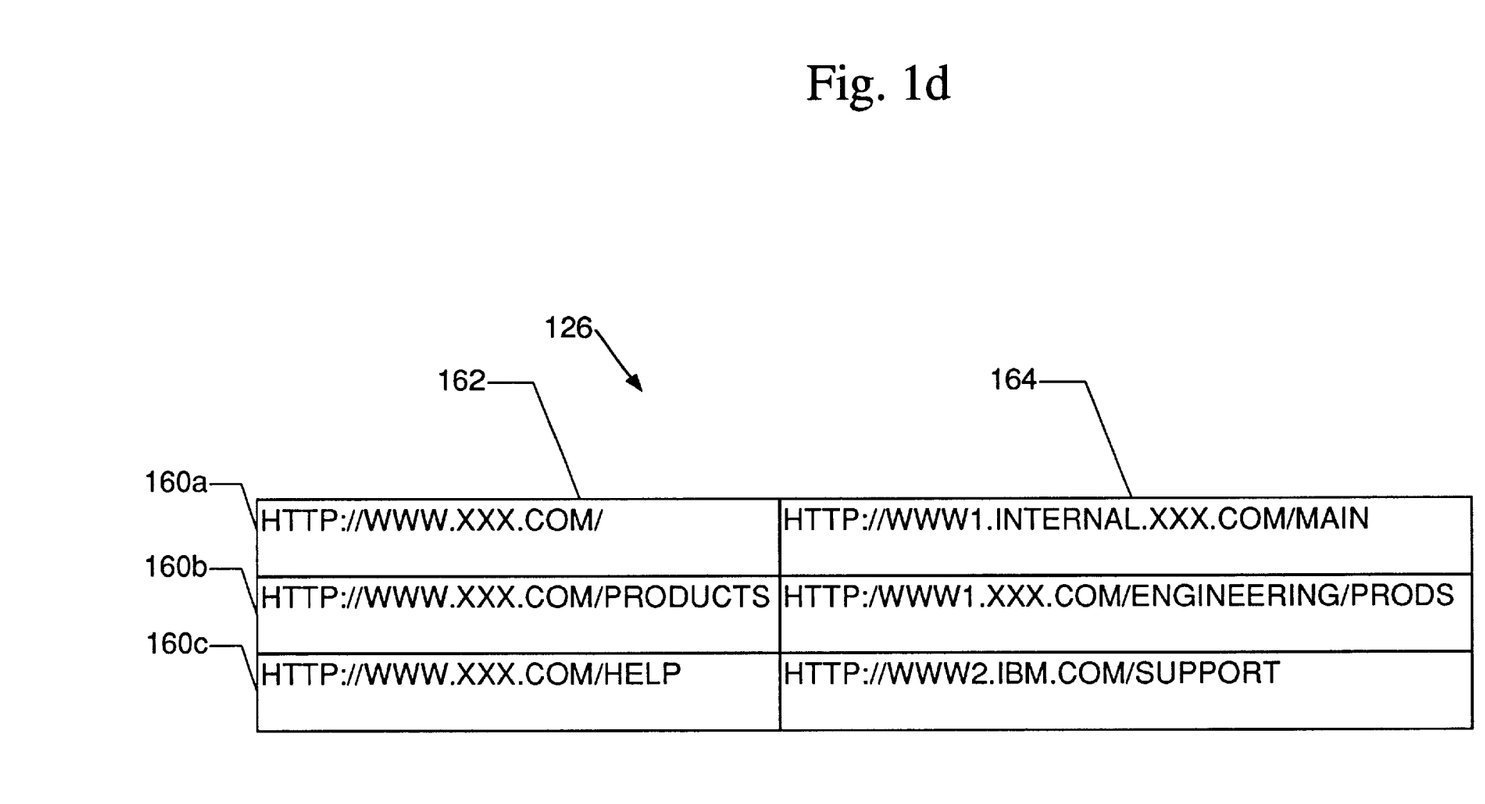
FIG. 1d is an exemplary format of a mapping table 126, shown in FIG. 1b.

An exemplary format of a mapping table 126 of FIG. 1b is shown in FIG. 1d. Mapping table 126 includes a plurality of entries, such as entries 160a–c. Each entry includes a field 162 containing an original content request that is received by front-end proxy server 104. Each entry also includes a field 164 containing a remapping of the original content request to one or more back-end servers. Typically, the original content request and the remapping are in Uniform Resource Locator (URL) format.

An exemplary web site 200 having distributed back-end servers, according to the present invention, is shown in FIG. 2. Web site 200 includes two or more back-end web servers, such as a back-end web servers 202a and 202b, and front-end proxy server 204. Servers 202a and 202b are coupled to server 104 by communications link 206, which is typically a high-speed network connection, for example, 10T or 100T Ethernet, and communicate using a standard communication protocol, for example, Hypertext Transfer Protocol (HTTP). Servers 202a and 202b are full-function web servers, which implement the features and functions of the web site. Servers 202a and 202b access their respective information content 208a and 208b and transmit that content using server application program interface (API) routines 210a and 210b.

Front-end proxy server 204 acts as the entry point to web site 200. This allows organizations that have servers that maintain different types of information or have different owners to unify these servers to project a single end-user entry point. Thus, the user views the web site as a single integrated site.

Figure 3:
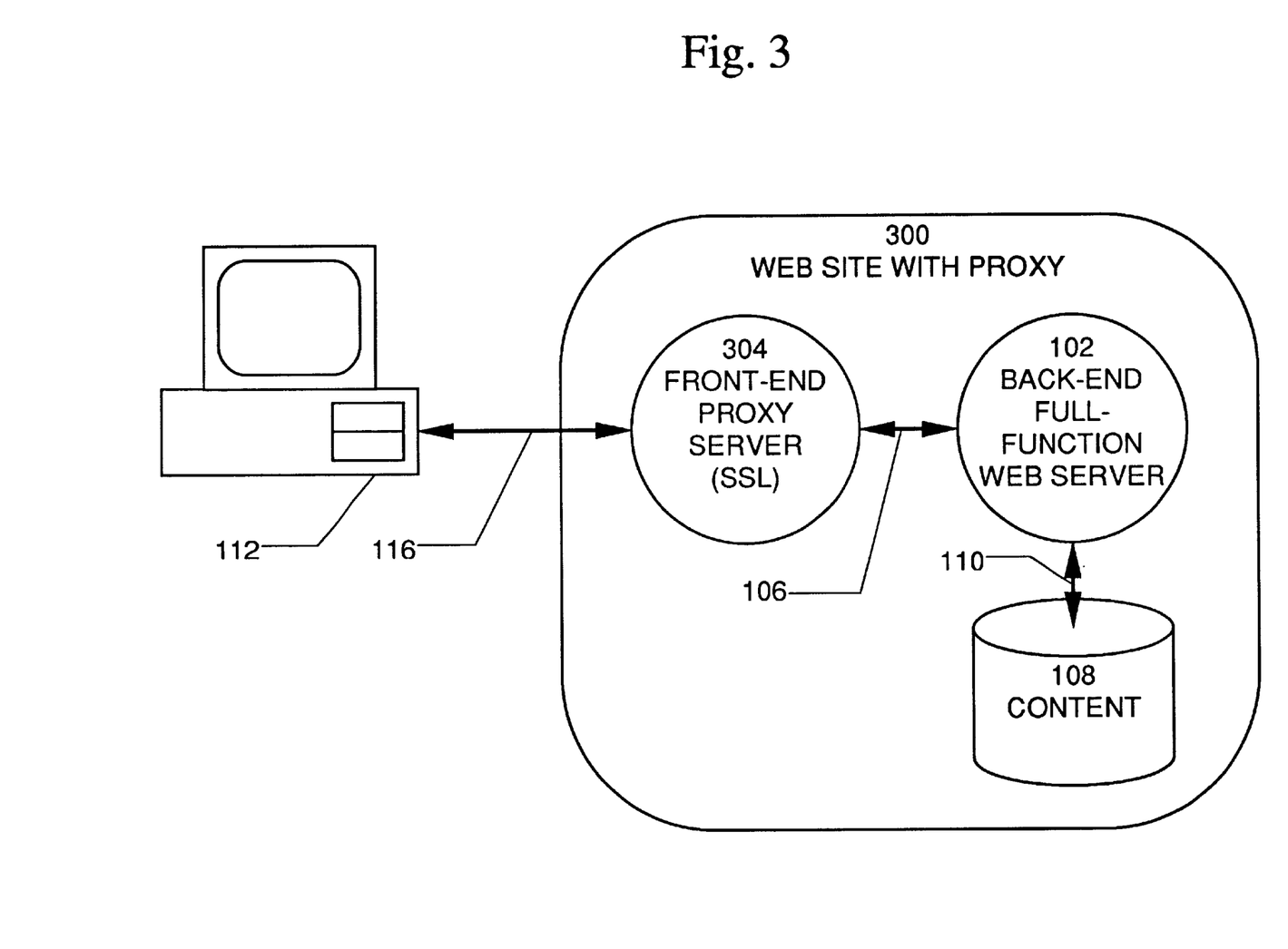
FIG. 3 is a block diagram of another embodiment of a web site including a front-end proxy server, illustrating incorporation of new technologies, according to the present invention.

New technologies can be implemented in the front-end proxy, eliminating the need to upgrade or modify the back-end web servers for each new technological development. An example of this is shown in FIG. 3, in which a new technology, such as secure sockets, is implemented in the web site 300 shown in FIG. 1. Front-end proxy server 304 incorporates a secure sockets layer (SSL), which implements secure information transfer between web site 300 and system 112. Implementation of SSL requires modification of only front-end proxy server 304. Back-end server 102 was not modified, and need not even be aware of the change to server 304.

Figure 4A:
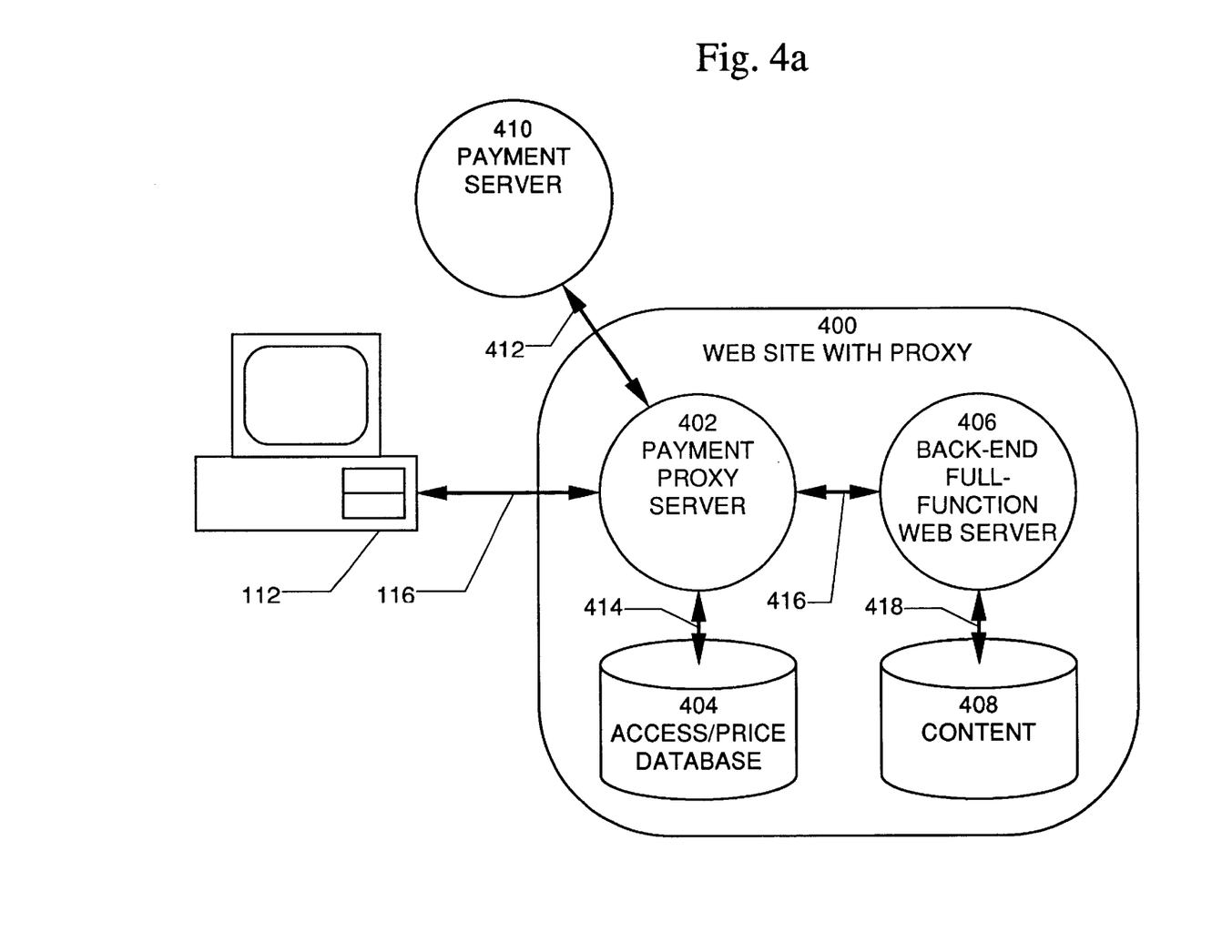
FIG. 4a is a block diagram of another embodiment of a web site including a front-end proxy server, adapted for electronic commerce, according to the present invention.

Electronic commerce elements, such as commerce protocols and secure electronic transactions, etc., can be implemented more easily using a front end proxy, as shown in FIG. 4a. Web site 400 includes payment proxy server 402 and access/price database 404, as well as back-end server 406 and content 408. Payment proxy server 402 is coupled to payment server 410 over communications link 412, which transports information using an electronic commerce protocol. Payment proxy server 402 receives electronic commerce requests from Internet users, such as a user at system 112 and processes each request. Access/price database 402 contains information specifying access categories for various users and various content items, as well as prices for each content item. Payment proxy server 402 typically accesses database 404 using database application program interface (API) routines 414, which are typically implemented as part of the operating system of server 402. Payment proxy server 402 communicates with back-end server 406 over link 416, typically using HTTP. Back-end server 406 typically accesses and transmits content 408 using server API routines 418, which are typically implemented as part of the operating system of server 406.

Figure 4B:
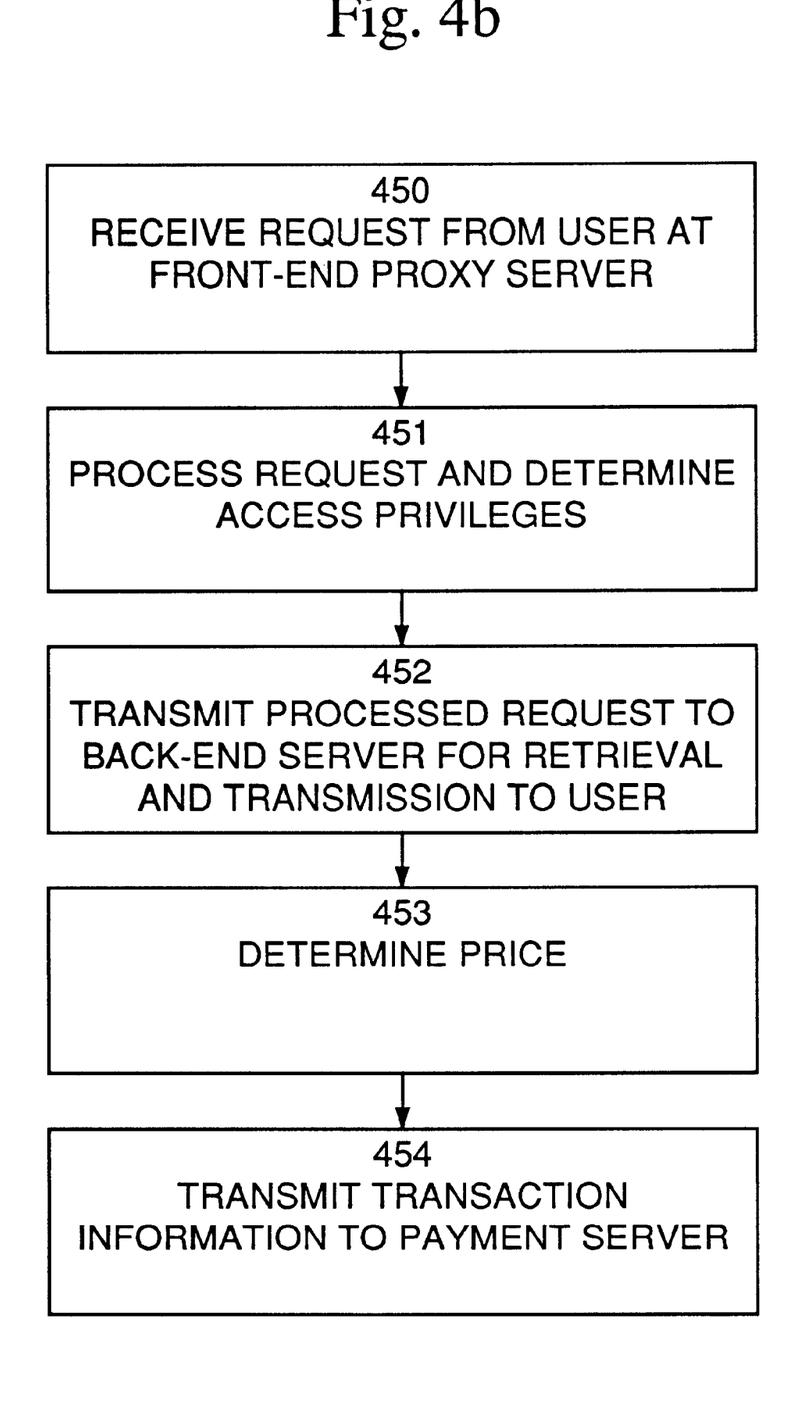

An electronic commerce process, according to the present invention, is shown in FIG. 4b. This figure is best viewed in conjunction with FIG. 4a. The process begins with step 450, in which a front-end proxy server 402 receives a request for a content object from a web browser application program operated by a user. Content objects may include documents, graphics, programs, etc., which are included in content 408.

In step 451, front-end proxy server 402 processes the received request. In addition to the processing performed in step 151 of FIG. 1b, payment proxy server 402 determines whether the user who transmitted the request is entitled to access the requested content. Server 402 accesses the access/price database 404 and retrieves information relating to those users or groups of users who are entitled to access the requested content. This information may be stored on a content item by content item basis, or it may be based on groups of content items, as would be indicated by, for example, the directories in which the items are stored, or on types of content items, as would be indicated by, for example, file types or extensions associated with each content item. User access privileges may also be based on user characteristics, such as the identity of the user, a group to which the user belongs, such as a subscriber organization, a subscription option, etc. If the user who requested an item is entitled to access that item, then in step 452, the processed request or requests are transmitted to one or more back-end servers, which handle each request by retrieving the content object specified by the request. The actions performed in this step are similar to the actions performed in steps 152 to 155 of FIG. 1b.

In step 453, front-end proxy server 402 determines the price that the user will be charged for accessing the content item. Server 402 accesses the access/price database 404 and retrieves pricing information for the requested content item. This information may be stored on a content item by content item basis, or it may be based on groups of content items, as would be indicated by, for example, the directories in which the items are stored, or on types of content items, as would be indicated by, for example, file types or extensions associated with each content item. Prices may also be based on user characteristics, such as the identity of the user, a group to which the user belongs, such as a subscriber organization, a subscription option, etc. The price database may be separate from the access database, or they may be combined, as shown in FIG. 4a. Likewise, the price determination may be a separate step, as shown in FIG. 4b, or it may be combined with step 451. In step 454, information relating to the transaction is transmitted to payment server 410, so that the transaction can be charged to the user. Such transaction information typically includes identification of the party to be charged, here the user, the party to be credited, here the web site operator or content provider and the monetary amount of the transaction, which is, of course, based on the prices of the content items transmitted to the user.

Figure 5A:
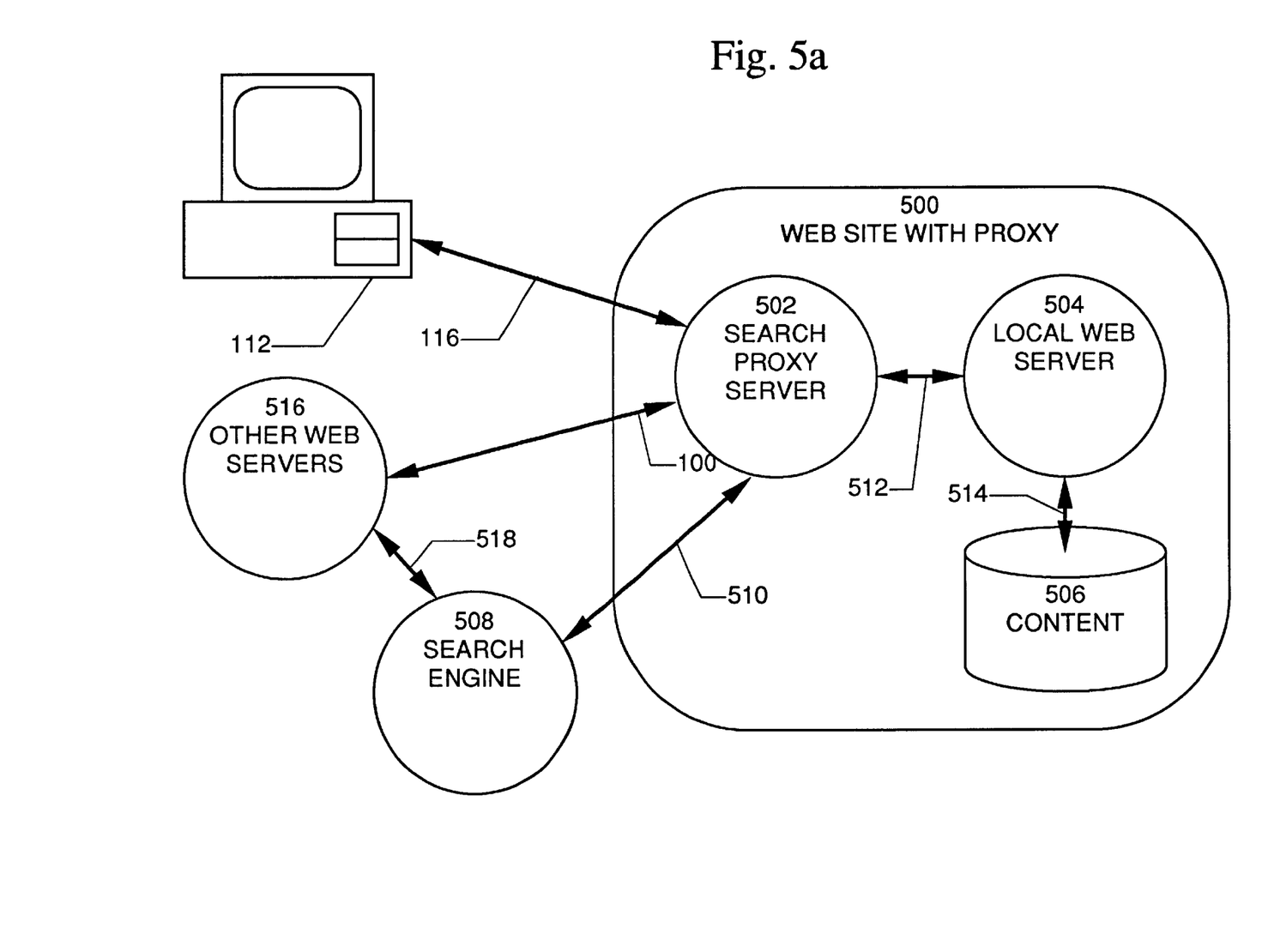
FIG. 5a is a block diagram of another embodiment of a web site including a front-end proxy server, adapted for transparent extended searching, according to the present invention.

A front-end proxy may be used to transparently implement extended searching capabilities. An example of this is shown in FIG. 5a, in which transparent searching is implemented in web site 500. Web site 500 includes search proxy server 502, as well as back-end server 504 and content 506. Search proxy server 502 is coupled to payment server 508 by communications link 510, which transports information using a protocol such as HTTP. Search proxy server 502 receives content requests from Internet users, such as a user at system 112, and processes each request. Search proxy server 502 communicates with back-end server 504 over link 512, typically using a protocol such as HTTP. Back-end server 504 typically accesses and transmits content 506 using server API routines 514, which are typically implemented as part of the operating system of server 504. Content items that are retrieved from back-end server 504 may be scanned for topical content using software, such as a topic analyzer or a keyword extraction tool. The extracted information may be sent to search engine 508 to find and retrieve similar content.

Figure 5B:
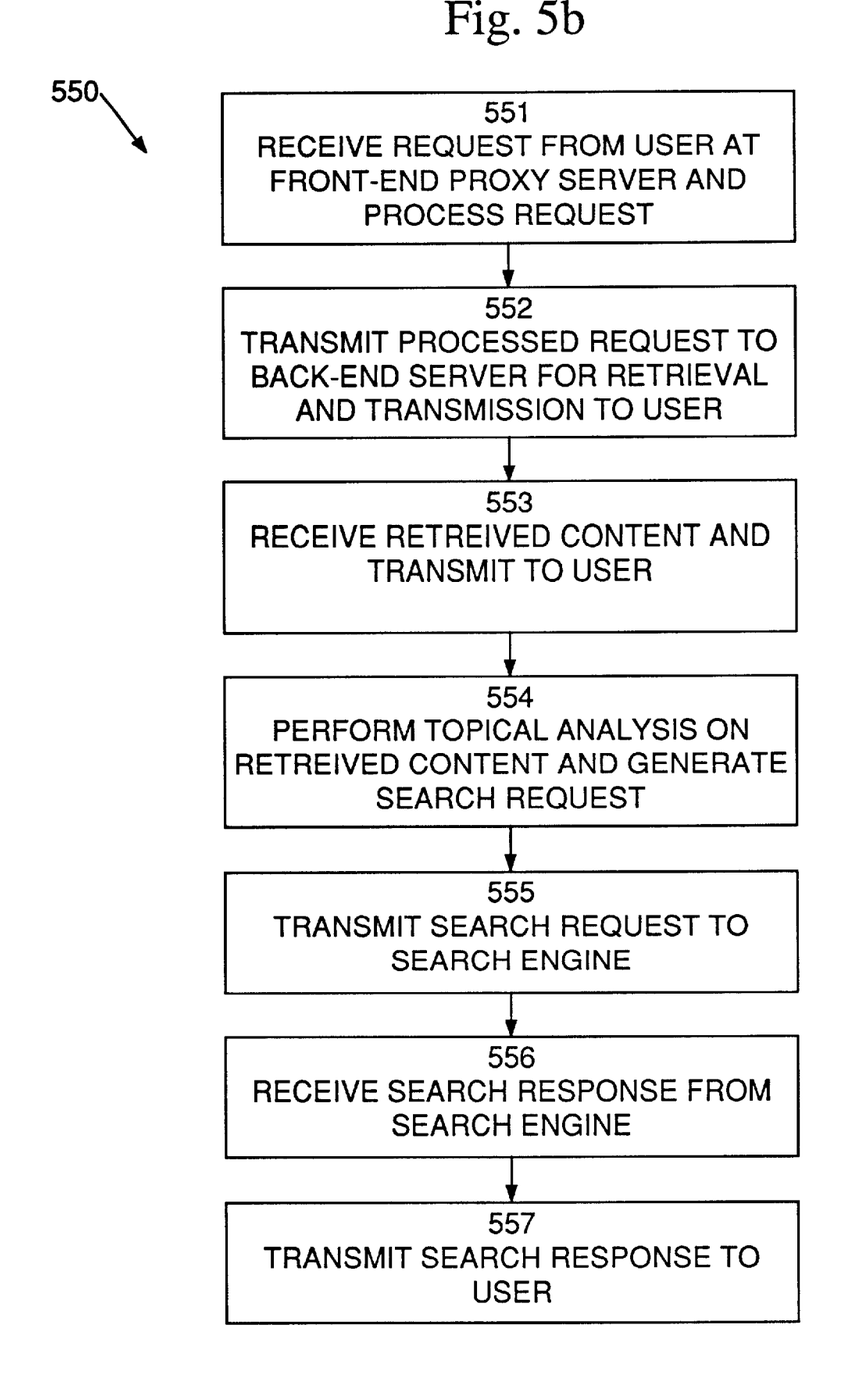

A transparent extended search process 550, according to the present invention, is shown in FIG. 5b. This figure is best viewed in conjunction with FIG. 5a. The process begins with step 551, in which a front-end proxy server 502 receives a request for a content object from a web browser application program operated by a user. Content objects may include documents, graphics, programs, etc., which are included in content 506. Search proxy server 502 processes the received request. In step 552, the processed request is transmitted to one or more back-end servers, which handle the request by retrieving the content object specified by the request. In step 553, the search proxy server receives the retrieved content from the back-end server and transmits the retrieved content to the user The actions performed steps 552 and 553 are similar to the actions performed in steps 152 to 155 of FIG. 1b.

In step 554, search proxy server 502 performs topical analysis on the content items retrieved from back-end server 504. The retrieved content items are scanned for topical content using software, such as a topic analyzer or a keyword extraction tool. One or more search requests are generated based on the extracted topical content. In step 555, the generated search requests are transmitted to search engine 508 over communication link 510. Typically, link 510 is the Internet and the protocol used is HTTP. Other embodiments are possible. For example, link 510 may be a local or wide area network using HTTP or other protocols. Search engine 508 performs the requested searches on other web servers 516 using well-known searching techniques. Search engine 508 is coupled to other web servers 516 by communication link 518, which typically is the Internet. Search engine 516 generates a response to the search request and transmits the response to search proxy server 502. Such a response may include summaries of content items found on other web servers 516, excerpts or extracts from such content items, or the complete content items themselves.

In step 556, search proxy server 502 receives the search response from search engine 508 and, in step 557, transmits all or part of the search response to the user. In this way, extended searching capabilities may be added to web site 500 without necessitating any modifications to back-end server 504 or search engine 508.

Figure 6:
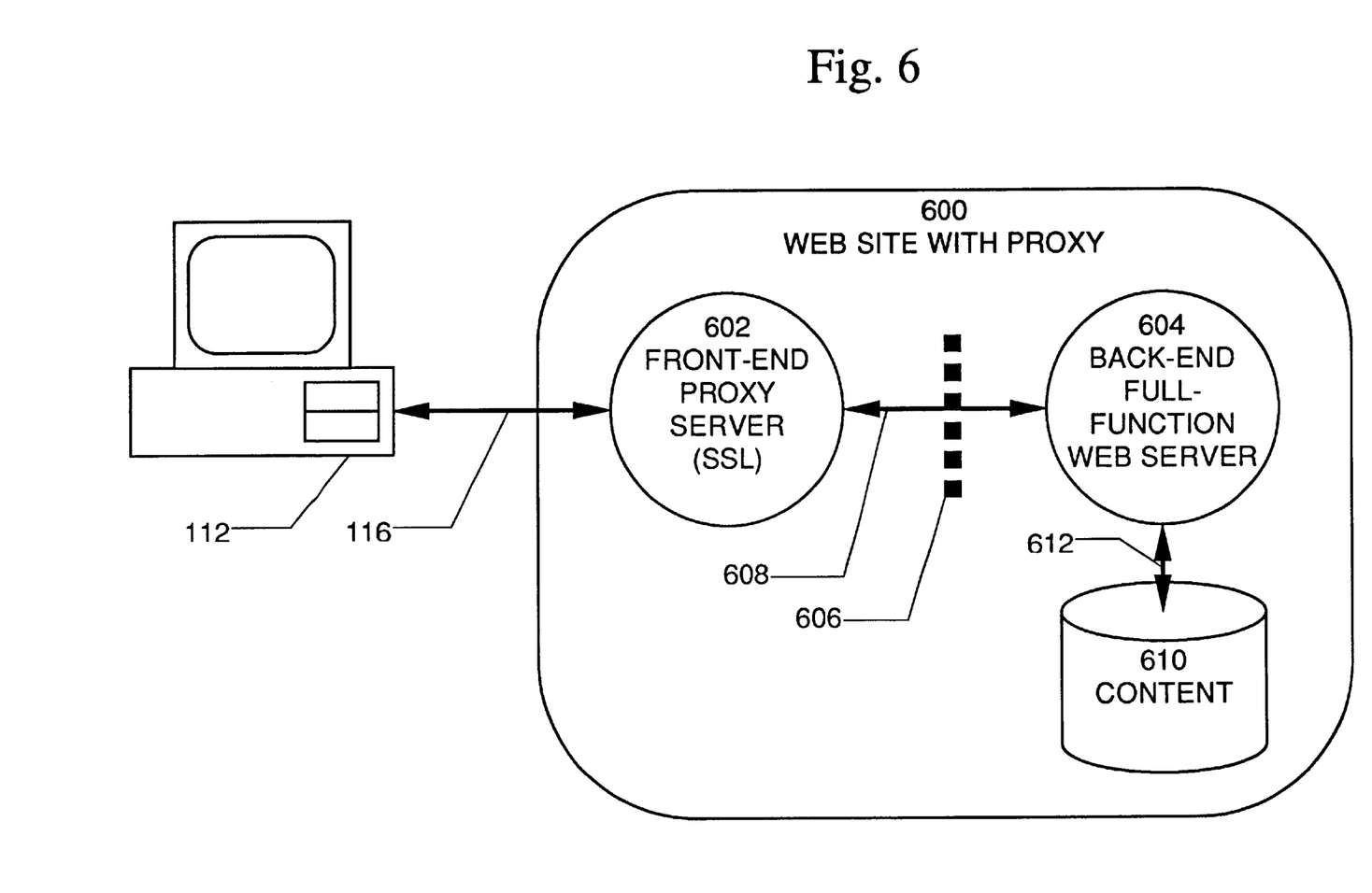
FIG. 6 is a block diagram of another embodiment of a web site including a front-end proxy server, providing a secure firewall for the back-end servers, according to the present invention.

A front-end proxy may be used to provide the gateway through a web site's firewall, thus protecting the system hosting the content. An example of this is shown in FIG. 6, in which the front-end proxy server 602 of web site 600 accesses back-end server 604 through firewall 606. Front-end proxy server 602 receives content requests from Internet users, such as a user at system 112, and processes each request. Front-end proxy server 602 communicates with back-end server 504 over secure link 608, which is the only access point to back-end server 604. This combination of security and exclusive access provides firewall 606. Back-end server 604 typically accesses and transmits content 610 using server API routines 612, which are typically implemented as part of the operating system of server 604.

The only way for users, such as the user on system 112, to access content 610 on back-end server 604 is through front-end proxy server 602. Front-end proxy server 602 accesses back-end server 604 through secure communications, IP address checking, or other security measures. Back-end server 604 is configured to respond only to those external access requests that come from font-end proxy server 602. Thus, content 610 is not present on the server that users can access, front-end proxy server 602. This provides enhanced security and protection of content 610 over conventional server systems.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of electronic communication, comprising the steps of:
   receiving a content request from a user system at a front-end proxy server;
   processing the received content request at the front-end proxy server to select at least one back-end server based on the requested content;
   transmitting the processed content request to the selected back-end server;
   receiving a content item corresponding to the content request from the selected back-end server;
   performing topical analysis on the received content item;
   generating a search request based on the topical analysis;
   transmitting the search request to a search engine;
   receiving a search response from the search engine:
   transmitting the search response to the user system; and
   transmitting the content item to the user system wherein transmission of the content item is throttled to manage an available bandwidth of an Internet connection.

2. The method of claim 1, wherein the processing step comprises the step of:
   mapping the received content request to a selected server.

3. The method of claim 2, wherein the received content request comprises an identifier of a first server and the mapping step comprises the step of:
   mapping the identifier of the first server to an identifier of a second server.

4. The method of claim 1, further comprising the steps of:
   determining whether the user system has access privileges for the content item corresponding to the content request; and
   transmitting the content request to the selected server, if the user system has access privileges for the content item corresponding to the content request.

5. The method of claim 4, further comprising the steps of:
   determining a price of the content item; and
   transmitting transaction information including an identification of the user system and the price of the content item.

6. The method of claim 1, wherein the content request and the content item are communicated between the front-end proxy server and the user system over the Internet.

7. A system for electronic communication, comprising:
   a front-end proxy server receiving a content request from a user system, processing the content request to select at least one back-end server based on the requested content, transmitting the processed content request to the selected back-end server, receiving a content item corresponding to the processed content request from the selected back-end server, performing topical analysis on the received content item, generating a search request based on the topical analysis, transmitting the search request to a search engine, receiving a search response from the search engine, and transmitting the search response to the user system and transmitting the content item to the user system by throttling transmission of the content item to the user system to manage the available bandwidth of an Internet connection; and
   a back-end server comprising a content storage device containing a plurality of content items, the back-end server receiving processed content requests from the front-end proxy server, retrieving a content item corresponding to the content request and transmitting the retrieved content item to the front-end proxy server.

8. The system of claim 7, wherein the front-end proxy server comprises:
   a mapping table mapping the received content request to a selected server.

9. The system of claim 8, wherein the received content request comprises an identifier of a first server and the mapping table comprises:
   an identifier of the first server; and
   a corresponding identifier of a second server.

10. The system of claim 7, wherein the front-end proxy server further determines whether the user system has access privileges for the content item corresponding to the content request and transmits the content request to the selected server, if the user system has access privileges for the content item corresponding to the content request.

11. The system of claim 10, wherein the front-end proxy server further determines a price of the content item and transmits transaction information including an identification of the user system and the price of the content item.

12. The system of claim 7, wherein the content request and the content item are communicated between the front-end proxy server and the user system over the Internet.

13. A front-end proxy server, comprising:
   means for receiving a content request from a user system;
   means for processing the received content request to select at least one back-end server based on the requested content;

means for transmitting the processed content request to the selected back-end server;

means for receiving a content item corresponding to the content request from the selected back-end server;

means for performing topical analysis on the received content item;

means for generating a search request based on the topical analysis;

means for transmitting the search request to a search engine;

means for receiving a search response from the search engine;

means for transmitting the search response to the user system; and means for transmitting the content item to the user system, including means for throttling transmission of the content item to the user system to manage the available bandwidth of an Internet connection.

14. The system of claim 13, wherein the processing means comprises:

means for mapping the received content request to a selected server.

15. The system of claim 14, wherein the received content request comprises an identifier of a first server and the mapping means comprises:

means for mapping the identifier of the first server to an identifier of a second server.

16. The system of claim 13, further comprising:

means for determining whether the user system has access privileges for the content item corresponding to the content request; and means for transmitting the content request to the selected server, if the user system has access privileges for the content item corresponding to the content request.

17. The system of claim 16, further comprising:

means for determining a price of the content item; and means for transmitting transaction information including an identification of the user system and the price of the content item.

18. The system of claim 13, wherein the content request and the content item are communicated between the front-end proxy server and the user system over the Internet.

* * * * *